US010006774B2

(12) United States Patent
Baselau et al.

(10) Patent No.: US 10,006,774 B2
(45) Date of Patent: Jun. 26, 2018

(54) METHOD OF RESOLVING A POINT LOCATION FROM ENCODED DATA REPRESENTATIVE THEREOF

(71) Applicant: TomTom Traffic B.V., Amsterdam (NL)

(72) Inventors: Sven Baselau, Berlin (DE); Antoine Carl van der Laan, Lelystad (NL)

(73) Assignee: TOMTOM TRAFFIC B.V., Amsterdam (NL)

(*) Notice: Subject to any disclaimer, the term of this patent is extended or adjusted under 35 U.S.C. 154(b) by 46 days.

(21) Appl. No.: 15/101,421

(22) PCT Filed: Dec. 4, 2014

(86) PCT No.: PCT/EP2014/076628
§ 371 (c)(1),
(2) Date: Jun. 3, 2016

(87) PCT Pub. No.: WO2015/082639
PCT Pub. Date: Jun. 11, 2015

(65) Prior Publication Data
US 2016/0313130 A1 Oct. 27, 2016

(30) Foreign Application Priority Data

Dec. 4, 2013 (GB) .................................. 1321357.4
Apr. 24, 2014 (GB) .................................. 1407268.0

(51) Int. Cl.
G01C 21/32 (2006.01)
G01C 21/36 (2006.01)
G08G 1/054 (2006.01)

(52) U.S. Cl.
CPC ......... G01C 21/32 (2013.01); G01C 21/3697 (2013.01); G08G 1/054 (2013.01)

(58) Field of Classification Search
CPC ..... G01C 21/32; G01C 21/3697; G08G 1/054
See application file for complete search history.

(56) References Cited

U.S. PATENT DOCUMENTS 8,954,265 B2 2/2015 Hagan
2012/0095672 A1 4/2012 Adachi et al.
(Continued)

FOREIGN PATENT DOCUMENTS

EP 2161541 A1 3/2010
GB 2487263 A 7/2012
(Continued)

OTHER PUBLICATIONS

Search Report of United Kingdom Application No. GB1407268.0 dated Oct. 27, 2014.
(Continued)

Primary Examiner — Mussa A Shaawat
Assistant Examiner — Michael V Kerrigan

(57) ABSTRACT

Embodiments of the present invention provide a method of resolving a point location from a location reference, the location reference comprising a plurality of location reference points, each location reference point being representative of a node in a first digital map and having attributes associated therewith from the first digital map, including geographic coordinates of the node, so as to define a path between a start location reference point and an end location reference point, the location reference further comprising an offset value representative of a distance along the path. The method comprises obtaining (410) the geographic coordinates of the start location reference point (210) and the end location reference point (220), determining geographic coordinates of a location (250) along a line (230) extending between the geographic coordinates of the start location reference point (210) and the end location reference point (220) corresponding to the offset value (240), and using the determined geographic coordinates (250) as an approximate location of the point location in a second digital map.

20 Claims, 4 Drawing Sheets

(56) References Cited

U.S. PATENT DOCUMENTS

2013/0030692 A1* 1/2013 Hagan .................. G01C 21/32
                                                            701/410
2015/0316385 A1* 11/2015 Serbanescu ............ G01C 21/30
                                                            701/454

FOREIGN PATENT DOCUMENTS

WO    2010000706 A1    1/2010
WO    2010000707 A1    1/2010

OTHER PUBLICATIONS

International Search Report of International Application No. PCT/EP2014/076628 dated Mar. 5, 2015.

* cited by examiner

METHOD OF RESOLVING A POINT LOCATION FROM ENCODED DATA REPRESENTATIVE THEREOF

CROSS-REFERENCE TO RELATED APPLICATIONS

The present application is a National Stage of International Application No. PCT/EP2014/076628, filed on Dec. 4, 2014, and designating the United States, which claims benefit to United Kingdom Patent Application 1321357.4 filed on Dec. 4, 2013, and United Kingdom Patent Application 1407268.0 filed on Apr. 24, 2014. The entire content of these applications is incorporated herein by reference.

FIELD OF THE INVENTION

The present invention is concerned with a method of resolving a point location represented by data encoded according to one or more predetermined formats, and more specifically is concerned with a method for determining a point location, encoded using a first digital map, within a second, different digital map. The invention is preferably most applicable to the resolving of an encoded data representative of a point location along a path through a network of roads or other navigable thoroughfares represented in a digital map.

BACKGROUND TO THE INVENTION

Any modern digital map (or mathematical graph, as they are sometimes known) of a road or other navigable network, in its simplest form, is effectively a database containing data representative of nodes, most commonly representative of road intersections, and lines between those nodes representing the roads between those intersections. In more detailed digital maps, lines may be divided into segments defined by a start node and end node, which may be the same in the case of a segment of zero length, but are more commonly separate. Nodes may be considered "real" or "valid" for the purposes of this application when they represent a road intersection at which a minimum of 3 lines or segments intersect, whereas "artificial" or "avoidable" nodes are those which are provided as anchors for segments not being defined at one or both ends by a real node. These artificial nodes are useful in digital maps to provide, among other things, shape information for a particular stretch of road or a means of identifying the position along a road at which some characteristic of that road changes, e.g. a speed limit.

In practically all modern digital maps, nodes and segments are further defined by various attributes which are again represented by data in the database, e.g. each node will typically have geographical coordinates to define its real-world position, e.g. latitude and longitude. The complete "graph" of the road network is described by millions of nodes and segments to cover an area of spanning one or more countries, or part thereof.

In the context of devising a means of efficiently referencing or describing a line location (i.e. a path through a road network), it is not only highly inefficient simply to provide an ordered list of all nodes (and/or segments, and optionally their attributes) within the digital map which form part of the location, but such a referencing method would necessitate that exactly the same digital map was used during any de-referencing which later occurred, for example in a mobile device to which the location reference was transmitted, because nodes, segments, lines and their attributes are practically only ever uniquely defined in a particular version of a map created by a particular map vendor. Even fundamental attributes such as longitude and latitude for a particular node might differ between different digital maps.

One particular attribute often provided in digital maps is a Traffic Message Channel (TMC) location table reference. TMC is a technology for delivering traffic and travel information to vehicle users, and more particularly to navigation systems (either portable or integrated) present within those vehicles and which include some form of digital map. A TMC message consists of an event code (which need not be traffic-specific, although these are most common) and a location code, often consisting of an ordered list of location references by means of which the location of the traffic event can be determined in the digital map and thus represented graphically on the screen of the navigation system. A number of pre-defined nodes in most commercially available digital maps are assigned a TMC location reference which is determined with reference to a limited location table.

Although TMC messages are very efficient in that they can be as short as 37 bits in length and therefore do not impinge significantly on available bandwidth for broadcast data, only a fixed number of location references are available, and therefore typically only motorways and major highways (or intersections thereon) in each country offering TMC can be referenced.

In order to overcome the deficiencies in pre-coded location referencing methods, e.g. TMC, a number of dynamic location referencing methods have been developed in recent years. Typically, these dynamic location referencing methods encode a location, e.g. a line location, by referencing nodes within a first digital map by their geographic coordinates, together with certain attributes of segments therebetween. This information can then be decoded or resolved on a second, different digital map to determine the equivalent location within the second digital map.

One example of a dynamic location referencing method is known as AGORA-C. A complete description of the AGORA-C location referencing approach can be found in the ISO Standard 17572-3 Intelligent Transport System (ITS)—Location Referencing for Geographic Databases—Part 3: Dynamic Location References, but the fundamentals of the approach are that a location reference can be completely specified by a set of location points, specified by coordinate pairs of latitude and longitude and ordered in a list, each point complying with various rules but most importantly being consecutive in terms of the location being referenced and the previous point in the list, i.e. successive points form a next-point-relationship. As with other location referencing systems, each point is provided with a number of attributes which assist in better defining that point, but specific to the AGORA-C method is the identification of each point as one of a Location Point (LP), an Intersection Point (IP), or a Routing Point (RP). LPs mark the start and end positions of the referenced location. Each point along the location at which the road section signature changes is represented by an IP, so locations being paths over a road network and which pass through intersections without any road section signature change need not be referenced by an intersection point. Routing points are provided where an intersection points alone are insufficient to unambiguously determine the correct location in the decoder, and are either added as separate points, or where a required routing point coincides with existing intersection point, a simple attribute change on the latter is made.

Another dynamic location referencing method is OpenLR™, which is an open source software project launched by TomTom International B.V. in September 2009 to provide an open standard for encoding, transmitting and decoding location references in digital maps. A complete description of the OpenLR™ location referencing approach can be found in the material provided at www.openlr.org, such as the OpenLR™ White Paper (latest version being v1.5 published on 17 Jan. 2012). Further details about the manner in which a line location is encoded can be found in the patent publication WO 2010/000707, and the manner by which it is decoded in the patent publication WO 2010/000706; the entire content of both documents being incorporated herein by reference. The main idea behind OpenLR™ is to describe a line location along the navigable network represented by a digital map by a concatenation of one or more, typically a plurality of, shortest paths. Each shortest path is specified by information about its start line and its end line. This information is combined in so-called location reference points (LRPs). The LRPs are ordered from the start of the location to the end of the location and the shortest-path between two subsequent LRPs covers a part of the location. The concatenation of all these shortest-paths covers the location completely and this path is called the location reference path. The location reference path may be longer than the original location and offsets trim this path down to the size of the location path. Thus, for each line location, at least two LRPs are needed for the start and end of the location, with intermediate LRPs acting as a guide for the route calculation. Attributes taken from the digital map are also associated with all LRPs, except the last LRP in the ordered list, in the encoded location reference. These attributes, which include the bearing (e.g. the angle between the true North and a line which is defined by the coordinate of the LRP and a coordinate which is a predetermined distance along the line defined by the LRP attributes), functional road class (i.e. a road classification based on the importance of the road), and form of way (i.e. the physical road type, e.g. motorway, multiple lane carriageway, single lane carriageway) define the outgoing path from each LRP forming the location reference path.

A number of other alternate dynamic location referencing methods are also in existence, such as TPEG-ULR. Again, however, an encoded line location reference according to TPEG-ULR comprises an ordered list of two or more locations defined by their geographical coordinates, together with additional information, such as direction, category (e.g. street category) and height, for use in resolving the encoded line location.

One common type of location that it is encoded using such dynamic location referring methods is a point location along a line. Such a point location is not simply described using its geographical coordinates, but in addition by its relation to a segment of the road or navigable network. More specifically, the location is typically defined as being a certain distance, commonly referred to as an offset, along the line between at least two nodes, and can be further defined as being on either side of the line, on both sides of the line, or directly on the line, and even in some embodiments as having an orientation with respect to the driving direction along the line. Examples of such locations can be: house numbers; address points; and points of interest (POIs), such as petrol stations, shopping malls, restaurants, indication loops and even speed cameras.

Although dynamic location referencing methods are typically highly accurate and offer a very high chance of a decoded location being equal to the original location that was encoded, e.g. more than 90%, there will some locations that can't be successfully decoded. In such situations, i.e. when an encoded location fails to be resolved, that location is essentially lost and a device using the digital map (on which the locations are being decoded) will not be able to display or otherwise use the location. Thus, for example, when the locations being decoded relate to speed cameras or other speed enforcement devices, this can lead to a user not being notified of a camera, despite it being known to exist.

The present invention aims to provide a method of mitigating this experience by ensuring that an approximate position can always be determined for any received encoded "point along a line" location even if the regular decoding process fails.

SUMMARY OF THE DISCLOSURE

According to the invention, there is provided a method of resolving a point location from a location reference, the location reference comprising a plurality of location reference points, each location reference point being representative of a node in a first digital map and having attributes associated therewith from the first digital map, including the geographic coordinates of the node, so as to define a path between a start location reference point and an end location reference point, the location reference further comprising an offset value representative of a distance along the path, the method comprising:

obtaining the geographic coordinates of the start location reference point and the end location reference point;

determining the geographic coordinates of a location along a line extending between the geographic coordinates of the start location reference point to the end location reference point corresponding to the offset value; and using the determined geographic coordinates as an approximate location of the point location in a second digital map.

In some embodiments, the method further comprises matching the approximate location to a segment of the second digital map. The matching preferably comprises determining the closest segment (or in embodiments the closet segment having certain attributes, e.g. that are similar to the attributes contained in the location reference) to the geographic coordinates of the approximate location, and projecting the approximate location onto the segment along a perpendicular to the line. In these embodiments, the projected location on the segment is then used as the approximate location of the point location in the second digital map.

The offset value can be an actual distance measure along the path, e.g. in meters, from the start or end location reference point, or can be given as a proportional measure, e.g. a percentage value.

The location reference may comprise only two location reference points, i.e. the start and end location reference points. In other embodiments, the location reference may comprise more than two location reference points, i.e. with one or more intermediate location reference points between the start and end location reference points.

The present invention extends to an electronic processing device for carrying out a method in accordance with any of the aspects or embodiments of the invention herein described.

Thus, in accordance with a second aspect of the invention there is provided a device for resolving a point location from a location reference, the location reference comprising a plurality of location reference points, each location reference point being representative of a node in a first digital map and having attributes associated therewith from the first digital map, including the geographic coordinates of the node, so as to define a path between a start location reference point and an end location reference point, the location reference further comprising an offset value representative of a distance along the path, the device comprising:

means for obtaining the geographic coordinates of the start location reference point and the end location reference point;

means for determining the geographic coordinates of a location along a line extending between the geographic coordinates of the start location reference point to the end location reference point corresponding to the offset value; and means for using the determined geographic coordinates as an approximate location of the point location in a second digital map.

As will be appreciated by those skilled in the art, this further aspect of the present invention can and preferably does include any one or more or all of the preferred and optional features of the invention described herein in respect of any of the other aspects of the invention, as appropriate. If not explicitly stated, the system of the present invention herein may comprise means for carrying out any step described in relation to the method of the invention in any of its aspects or embodiments, and vice versa.

The present invention is a computer implemented invention, and any of the steps described in relation to any of the aspects or embodiments of the invention may be carried out under the control of a set of one or more processors. The means for carrying out any of the steps described in relation to the system may be a set of one or more processors.

In general, the present invention in any of its embodiments may be, or be performed on, at least one processing device. The or a processing device may be a device of a mobile device, such as a navigation device, whether a PND or an integrated device, or may be a device of a server.

Any of the methods in accordance with the present invention may be implemented at least partially using software, e.g. computer programs. The present invention thus also extends to a computer program comprising computer readable instructions executable to perform, or to cause a device, e.g. navigation device and/or server, to perform a method according to any of the aspects or embodiments of the invention.

The invention correspondingly extends to a computer software carrier comprising such software which, when used to operate a system or apparatus comprising data processing means causes, in conjunction with said data processing means, said apparatus or system to carry out the steps of the methods of the present invention. Such a computer software carrier could be a non-transitory physical storage medium such as a ROM chip, CD ROM or disk, or could be a signal such as an electronic signal over wires, an optical signal or a radio signal such as to a satellite or the like. The present invention provides a machine readable medium containing instructions which when read by a machine cause the machine to operate according to the method of any of the aspects or embodiments of the invention.

BRIEF DESCRIPTION OF THE DRAWINGS

Embodiments of the invention are further described hereinafter with reference to the accompanying drawings, in which.

DETAILED DESCRIPTION OF PREFERRED EMBODIMENTS

Embodiments of the present invention will now be described with particular reference to a location reference representing a point along a line as encoded using the OpenLR™ location referencing method. It will be appreciated, however, and as discussed above, that the embodiments are equally applicable to resolving location references encoded using other dynamic location referencing methods, such as AGORA-C and TPEG-ULR.

Embodiments of the invention will also now be described with particular reference to the revolving of location references that are representative of speed enforcement devices, such as a fixed or mobile speed camera, a red light camera or the like.

It will be understood, however, the location references may also be representative of other points of interest (POI). The term "point of interest" takes it usual meaning within the art and thus refers to a permanent or temporary object at a particular location, e.g. point or region, that is of interest to a person or company, and which may have properties that vary in time. A POI may therefore be a building, such as a shop, tourist attraction or the like, or an area such as park. Similarly, a POI may be an object such as a speed limit enforcement device (as mentioned above), parking spaces, charging stations, e.g. for electric vehicles, and dynamic advertising space (capable of displaying data sent to it from a remote location).

Figure 1:
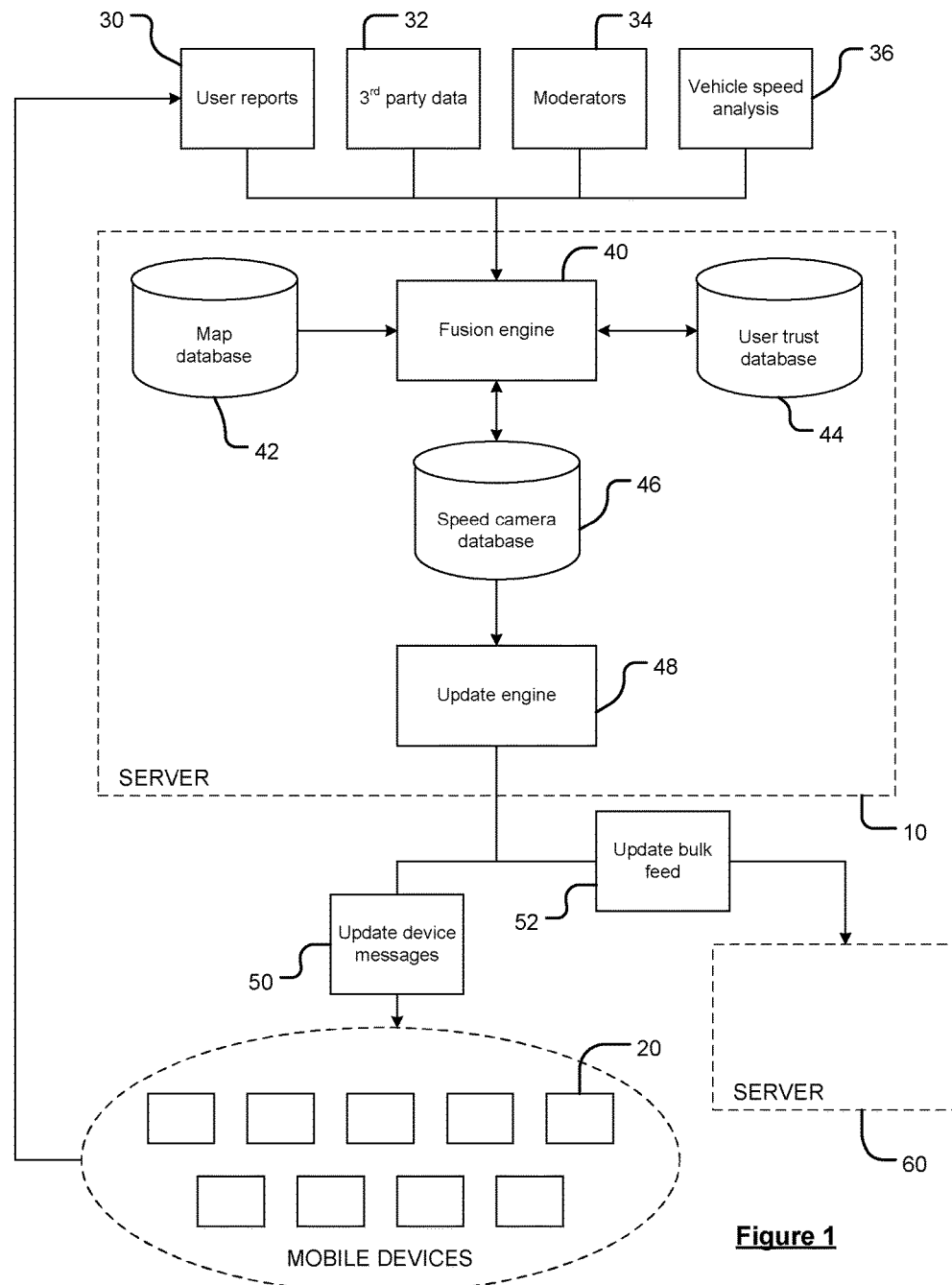
FIG. 1 is an illustration of a system according to an embodiment of the invention.

FIG. 1 shows an exemplary system for maintaining an updated database 46 of speed limit enforcement devices, such as mobile and/or fixed speed cameras, at a server 10, and for transmitting updated speed camera information 50 to a plurality of mobile devices 20 or another server 60. The mobile devices 20 are preferably configured to provide warnings to a user when a vehicle (in which the device is located) is approaching a speed limit enforcement device. In particular, the warning may be provided when the vehicle is approaching the speed limit enforcement device at a speed that is above the legal speed limit for the road. The warnings may comprise a visual warning on a display of the mobile device, an audible warning, a haptic warning, or any combination thereof as desired. In order to provide such warnings, the navigation device has access to a database of speed limit enforcement devices, which includes at least the location of speed limit enforcement device and a speed limit for the device. The database will typically be stored on the mobile device in a memory thereof, and will be regularly updated with new data from the server 10. It is envisaged, however, that the mobile device 20 may only temporary store portions of the database for speed limit enforcement devices in its immediate vicinity or on a planned route to be travelled.

Due to the nature of speed cameras, e.g. new fixed speed cameras are continually being installed, fixed speed cameras may be moved to a new location, mobile speed cameras will often be in operation for short periods of time, etc, the information in the database 46 on the server 10 needs to be constantly refreshed to ensure that it is accurate and up to date.

Information about the current status of speed cameras, i.e. in relation to the accuracy of the information in the database 46, can be obtained from a number of sources, and are combined in the fusion engine 40 to update the database 46. For example, user reports 30 can be received, e.g. from users of the mobile devices 20, confirming the presence of a camera, or an attribute thereof, or requesting the deletion of a camera. The user reports may be generated in any manner on the mobile devices 20 as appropriate. For example, the navigation device may have a hard button or soft key (on a touch screen display) that can be pressed to automatically generate and transmit a report to the server 10. Such a report may include the location, speed and/or direction of travel of the device 20 (and thus the vehicle) at the time the button is pressed. Additional or more accurate information about a speed camera may subsequently be added to a report by the user before it is transmitted to the server 10. For example, the user may provide the actual speed limit for the road and may also adjust the location of the speed camera as appropriate (e.g. as the location of the device provided in the report will not always reflect the actual position of the speed camera, but will typically be a short distance before or after the actual position of the camera). Speed camera data can also be obtained from various third parties 32, such as government data, other companies newspapers and other journalistic sources, etc. The existence of speed cameras can additionally be determined from sources, such as images collected by mobile mapping vehicles, and confirmed by moderators 34. It is also envisaged that location of speed cameras can be inferred from changes in the speed of individual vehicles or collections of vehicles 36.

At the fusion engine 40, the received speed camera information may be combined with one or more of: (i) information already existing in the speed camera database 46; (ii) information from a map database 42, e.g. to identify the location of a speed camera; and (iii) information from a user trust database 44, e.g. to provide an indication as to accuracy of reports previously received from a particular user. The information from all these sources is combined by the fusion engine 40 to produce new or amended speed cameras entries in the speed camera database 46.

As will be appreciated, each speed camera is stored in the database 46 with a number of attributes. These attributes can include one or more of: a location of the camera in terms of its geographic coordinates (e.g. longitude and latitude); a location of the camera with respect to a segment within the digital map 42, e.g. its position along the segment, the side of the segment on which the camera is positioned; a type of speed camera (e.g. a fixed camera, a mobile camera, etc); a speed limit associated with the camera; and a time period during which the camera is operational.

In some embodiments, the mobile devices 20 are arranged to provide travel information, such as warnings indicative of speed cameras, to users based on a current position of the device and a digital map. The mobile devices therefore comprise means for determining a current position of the device, such as a global navigation satellite system (GNSS) antenna by means of which satellite-broadcast signals, including location data, can be received and subsequently processed to determine a current location of the device. While in some cases the digital map on the mobile devices may be the same as the digital map 42 at the server 10, it many instances they will be different. Accordingly, it is often required that changes or updates to the information in the speed camera database 46 are transmitted to the mobile devices 20 (as updates messages 50) in a form that is not dependent on a digital map, i.e. in a map agnostic manner using a dynamic location referencing method.

Similarly, in other embodiments, updates to the speed camera database 46 may be transmitted to a third party server 60, e.g. as a bulk feed 52. The third party may then transmit these changes to associated mobile devices, for example after converting the updates into a proprietary format. Accordingly, it is again desirable the changes or updates to the information in the speed camera database 46 are transmitted in a form that is map agnostic.

Thus, in the update engine 48, the location of speed cameras that are new, to be modified or to be deleted are preferably encoded using a dynamic location referencing method, such as OpenLR™.

For example, when using OpenLR™, and as will be understood by those skilled in the art, the location of a speed camera is described as a "point along line" location type, wherein a reference path is defined between a "first location reference point (LRP)" and a "last LRP". The first LRP describes the start of the reference path, and the last LRP describes the end of the reference path. The first LRP has the following attributes: COORD (geographic coordinates, e.g. longitude and latitude); BEAR (bearing); FRC (functional road class); FOW (form of way); LFRCNP (lowest functional road class to next point); and DNP (distance to next point). The last LRP has the following attributes: COORD (geographic coordinates, e.g. longitude and latitude); BEAR (bearing); FRC (functional road class); FOW (form of way). Typically, the location reference will further include an POFF (positive offset) attribute indicating the distance, either in meters or as a percentage of the path length, from the first LRP, and may also further include an SOR (side of road) attribute indicating the side of the road on which the speed camera is positioned and/or an ORI (orientation) attribute indicating the orientation of the speed camera with respect to driving direction. The attributes, or the changed attributes, of the speed camera will also be associated with the location reference; thus creating an update message that can be transmitted to one or more of the mobile devices 20 or to another server 60.

These update messages will be received by a mobile device 20 or server 60, and an attempt is made to decode the information contained therein. In other words, a decoder operating at the device or server will receive the location reference and will try and match it to a location in the digital map stored at the device or server. This digital map may be the same as that used to encode the location, i.e. create the location reference, but will often be different, e.g. a different version of the digital map, or be provided by a different map provider. In many cases the location reference will be resolved successfully, and the speed camera can be suitably matched to an appropriate location in the digital map, and thereafter can be used for example to warn a user when he or she approaches the speed camera. Occasionally, however, the location reference will not be able to be resolved.

Figure 2:
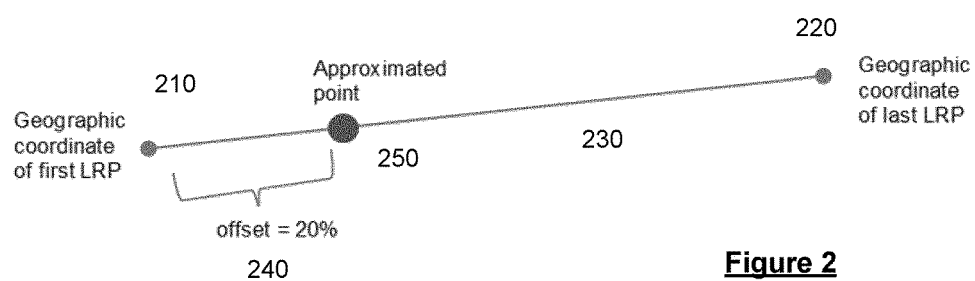
FIG. 2 illustrates an a point approximated according to an embodiment of the invention.

In this latter situation, it is desired to have a method of ensuring that a location reference can always be resolved. Thus, at least in embodiments of the present invention, following a failure of the decoder to resolve a "point along a line" location reference, the geographic coordinates of the two LRPs are obtained from the location reference. Typically the geographic coordinates will have already been extracted from the location reference in the original attempt to resolve the location. As shown in FIG. 2, the extracted geographic coordinates can be used to define straight line extending therebetween. The offset attribute, which again was extracted from the location reference can then be used to define an approximated point location along the line. For example, in the embodiment of FIG. 2 wherein the offset attribute is 20% of the reference path length from the first LRP, the approximated point location is said to be 20% of the distance along the defined straight line, and the geographic coordinates of the approximated point location can be determined accordingly. In some embodiments, the determined approximated point location is used as the location for the speed camera on the mobile device or server, e.g. for display or for further processing.

Figure 3:
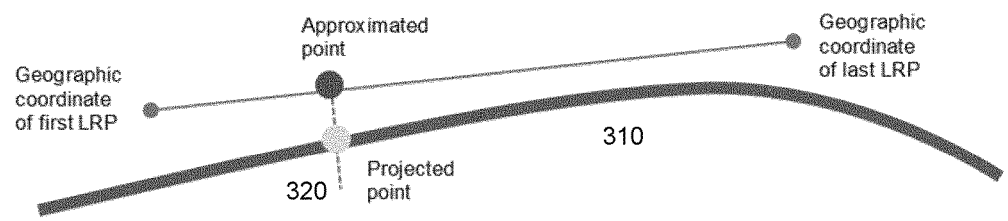
FIG. 3 illustrates a projected point according to an embodiment of the invention.

In other embodiments, the method can include the further step as shown in FIG. 3, wherein the approximated point location can be projected onto a segment—as indicated by the projected point location—within the digital map on the mobile device or server. The segment may be the closest segment to the approximated point location, or a segment within a predetermined distance of the approximated point location having certain attributes, e.g. based on one or more of the additional attributes extracted from the location reference. The determined projected point location can then be used as the location for the speed camera on the mobile device or server, e.g. for display or for further processing.

Figure 4:
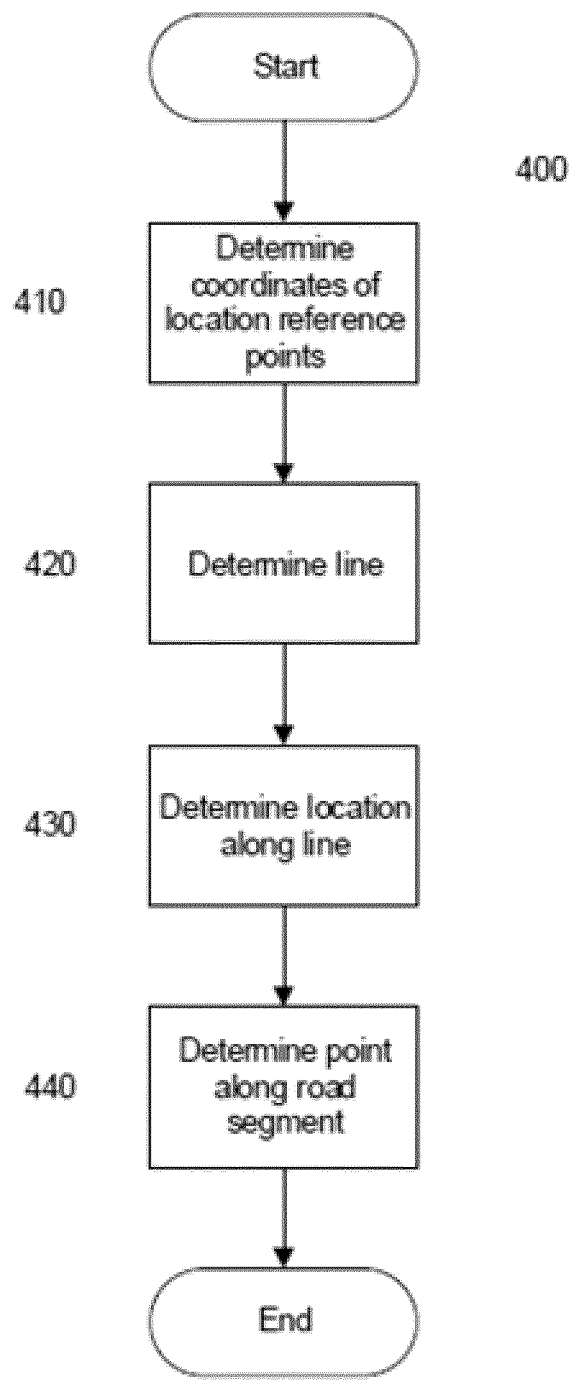
FIG. 4 illustrates a method according to an embodiment of the invention.
Figure 5:
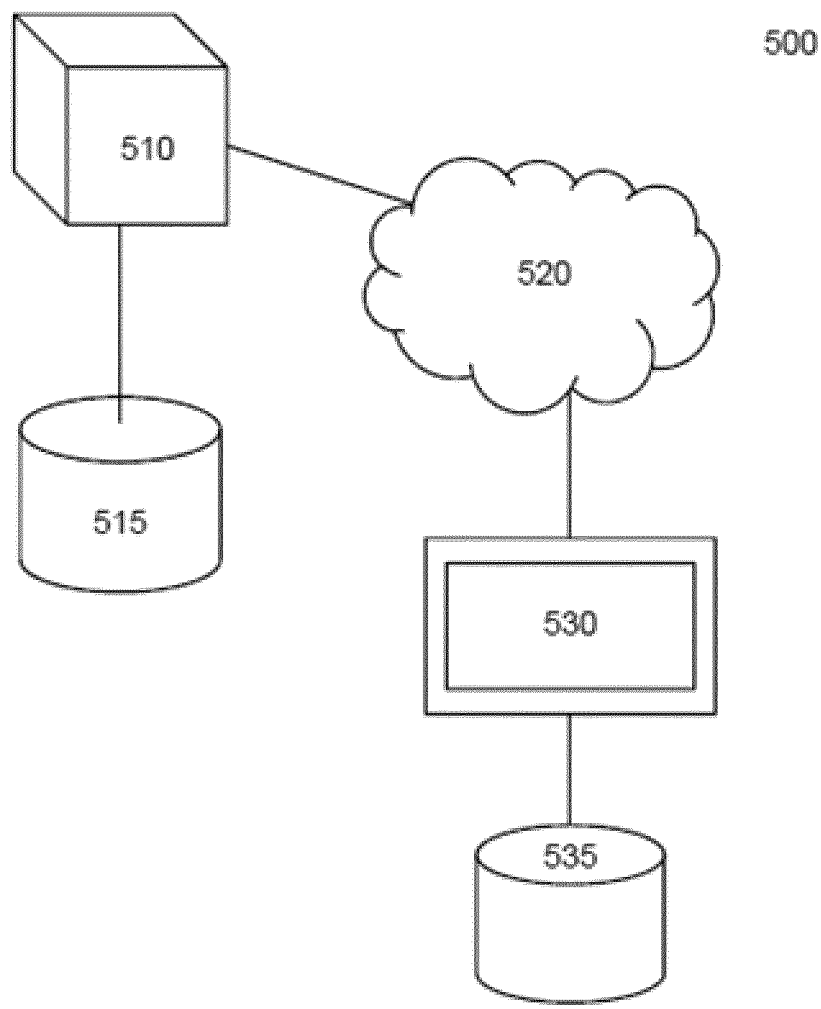
FIG. 5 further illustrates a system according to an embodiment of the invention.

FIG. 4 illustrates a method 400 according to an embodiment of the invention. The method 400 will be described with reference to FIG. 5 which illustrates a system 500 according to an embodiment of the invention. The method 400 is a method of resolving a point location from a location reference. The method may be performed by device having means for performing the method steps, such as a processor of a computing device 530, for example a mobile computing device. The method 400 may be performed by the computing device 530 when an encoded location fails to be resolved. The encoded location may have been received by the computing device 530 from another computing device 510 such as a server computer or another mobile computing device. The location reference is communicated from the another computer device 510 to the mobile computing device 530 via a communication network 520 which may include, at least partly, the internet and may also include a mobile communication network. The location may have been encoded using a dynamic location referencing technique, such as one of OpenLR™, AGORA-C or TPEG-ULR, although it will be realised that other dynamic location referencing techniques may be used. Referring to FIG. 5, the method 400 may be performed by a mobile computing device 530 which may be a smartphone, tablet computer or the like, which may execute navigation or other software responsive to a location of the device 530, or a device for providing navigation information to a user such as a dedicated navigation device. The software may provide a notification to a user of a POI in a vicinity of the location of the device 530. The POI 530 may be a speed enforcement device.

The another computer device 510, hereinafter server computer 510, is associated with a map database 515 storing digital map data according to a first format. The computing device 530 is associated with a map database 535 according to a second format. The first format and second format may be map data provided by different providers or suppliers, map data based on different source data or different versions of the same map data. It will be realised that other variations between the first and second formats may also be envisaged. The server computer 510 determines a location based on the map database 515 according to the first format. The location may correspond to the location of the POI such as the speed enforcement device. The location is then encoded according to the dynamic location referencing technique and communicated to the computing device 530 via the communication network 520. The computing device 530 attempts to resolve the encoded location with reference to the map database 535 according to the second format. The method 400 is performed when the resolution of the encoded location fails, for example due to a difference between the first and second formats. The method 400 is executed to avoid the encoded location being discarded by the device 530, for example to prevent failure of a warning of a speed enforcement device being provided.

In step 410 coordinates of location reference points are determined. The encoded location comprises at least first and second location reference points identifying start and end locations of a path. The location reference points correspond to geographic coordinates and may correspond to a node in the map data. The node may be a "real" or "valid" node wherein the node represents a road feature such a road intersection at which road segments intersect, or may represent an "artificial", "virtual" or "avoidable" node, which are nodes representing a point along a line. Such "virtual" nodes may be provided as anchors for segments not being defined at one or both ends by a real node. These artificial nodes are useful in digital maps to provide, among other things, shape information for a particular stretch of road or a means of identifying the position along a road at which some characteristic of that road changes, e.g. a speed limit. The coordinates identify the geographic location of the location reference points, such as in a coordinate system for example longitude and latitude, although other coordinate systems may be used. A coordinate 210 of the first location reference point and a coordinate 220 of the second location reference point illustrated in FIG. 2 are determined in step 410. The coordinates may be available to the computing device 530 from the previously failed attempt to resolve the encoded location.

In step 420 a line 230 is determined between the coordinates 210, 220 obtained from step 410 as illustrated in FIG. 2. The line 230 may be a straight line which intersects the first and second coordinates 210, 220 indicative of a path there-between.

In step 430 a location along the line 230 is determined. The location is determined as a location 250 approximating the encoded location which failed to be resolved, as indicated in FIG. 2. The location is determined based an offset value 240 representative of a distance along the path. In some embodiments the offset is indicative of a percentage value of a length of the path between the first and second locations 210, 220. In other embodiments the offset may be indicative of an absolute distance along the path, for example from the first coordinate 210. Thus, as a result of step 430, a location 250 is determined which may be used as an approximation for an encoded location which failed to be resolved. The location 250 may be used as a location of a point of interest such as a speed camera so that, for example, a warning may be provided as a location of a mobile computing device approaches the location of the speed camera. In some embodiments the method 400 may end following step 430.

In other embodiments the method 400 comprises a further step 440 in which the location 250 determined in step 430 is transposed or projected onto a road segment. The road segment may be one present in the map database 535. In step 440 a road segment in the map database 535 may be selected according to one or more criteria. The criteria may comprise one or more of the road segment being a closest segment to the approximated point location 250, or a segment within a predetermined distance of the approximated point location having certain attributes, e.g. based on one or more of the additional attributes extracted from the location reference. For example the road segment may be selected based on an attribute indicative of a class of road of which the segment is representative. As shown in FIG. 3 a road segment 310 is selected in step 440. In step 440 a point is projected onto the road segment 310 based on the location 250 determined in step 430. The projected point 320 may be at a location along the road segment 310 closest to the approximate location 250 determined in step 430. The projected point 320 may then be used as the encoded location, for example to provide a speed camera warning although it will be realised that other uses are envisaged within the scope of the invention.

Where not explicitly stated, it will be appreciated that the invention in any of its aspects may include any or all of the features described in respect of other aspects or embodiments of the invention to the extent they are not mutually exclusive. In particular, while various embodiments of operations have been described which may be performed in the method and by the apparatus, it will be appreciated that any one or more or all of these operations may be performed in the method and by the apparatus, in any combination, as desired, and as appropriate.

The invention claimed is:

1. A method of resolving a point location from a location reference, the location reference comprising a plurality of location reference points, each location reference point being representative of a node in a first digital map and having attributes associated therewith from the first digital map, including geographic coordinates of the node, so as to define a path between a start location reference point and an end location reference point, the location reference further comprising an offset value representative of a distance along the path, the method comprising:
   obtaining, using a processor, the geographic coordinates of the start location reference point and the end location reference point;
   defining a straight line extending between and intersecting the geographic coordinates of the start location reference point and the end location reference point;
   determining, using the processor, geographic coordinates of a location along the line corresponding to the offset value;
   using, by the processor, the determined geographic coordinates as an approximate location of the point location in a second digital map; and
   using the approximate location for one or more navigation operations involving the second digital map.

2. The method of claim 1, comprising selecting a segment of the second digital map based on the approximate location.

3. The method of claim 2, wherein selecting the segment comprises determining a closest segment of the second digital map to the geographic coordinates of the approximate location.

4. The method of claim 2, wherein selecting the segment comprises determining a segment of the second digital map associated with one or more attributes contained in the location reference.

5. The method of claim 2, comprising projecting the approximate location onto the segment.

6. The method of claim 1, wherein the offset value is one of: a distance measure along the path or a proportional measure along the path.

7. The method of claim 1, wherein determining geographic coordinates of the location comprises:
   determining the location at the offset value distance from the start location reference point along the straight line.

8. A method of determining a location of a Point of Interest (POI), comprising:
   receiving, using a processor, a location reference indicative of a location of the POI;
   determining, using the processor, an approximate location of the POI based on the location reference; and
   outputting, using the processor, a notification indicative of a proximity to the POI based on the approximate location;
   wherein the approximate location of the POI is determined by resolving a point location from a location reference, the location reference comprising a plurality of location reference points, each location reference point being representative of a node in a first digital map and having attributes associated therewith from the first digital map, including geographic coordinates of the node, so as to define a path between a start location reference point and an end location reference point, the location reference further comprising an offset value representative of a distance along the path, the method of resolving a point location from the location reference comprising:
   obtaining, using the processor, the geographic coordinates of the start location reference point and the end location reference point;
   defining a straight line extending between and intersecting the geographic coordinates of the start location reference point and the end location reference point;
   determining, using the processor, geographic coordinates of a location along the line corresponding to the offset value;
   using, by the processor, the determined geographic coordinates as an approximate location of the point location in a second digital map; and
   using the approximate location for one or more navigation operations involving the second digital map.

9. The method of claim 8, comprising determining that a location resolved from the location reference does not correspond to a location associated with digital map data and, in response thereto, determining the approximate location of the POI.

10. A device for resolving a point location from a location reference, comprising one or more processors, the location reference comprising a plurality of location reference points, each location reference point being representative of a node in a first digital map and having attributes associated therewith from the first digital map, including the geographic coordinates of the node, so as to define a path between a start location reference point and an end location reference point, the location reference further comprising an offset value representative of a distance along the path, the one or more processors being arranged to:
   obtain the geographic coordinates of the start location reference point and the end location reference point;
   defining a straight line extending between and intersecting the geographic coordinates of the start location reference point and the end location reference point;
   determine the geographic coordinates of a location along the line corresponding to the offset value;
   use the determined geographic coordinates as an approximate location of the point location in a second digital map; and
   using the approximate location for one or more navigation operations involving the second digital map.

11. The device of claim 10, wherein the one or more processors is arranged to select a segment of the second digital map based on the approximate location.

12. The device of claim 11, wherein the one or more processors is arranged to determine a closest segment of the second digital map to the geographic coordinates of the approximate location.

13. The device of claim 11, wherein the one or more processors is arranged to determine a segment of the second digital map associated with one or more attributes contained in the location reference.

14. The device of 11, wherein the one or more processors is arranged to project the approximate location onto the segment.

15. The device of claim 14, wherein the one or more processors is arranged to project the approximate location onto the segment along another line that is perpendicular to the line.

16. The device of claim 10, wherein the offset value is one of a distance measure along the path or a proportional measure along the path.

17. The device of claim 10 wherein the device is communicably coupled to a store comprising the second digital map.

18. The device of claim 10, wherein the one or more processors is further arranged to:
    determine the location at the offset value distance from the start location reference point along the straight line.

19. A non-transitory computer readable medium comprising instructions which, when read by one or more processors of a system, cause the system to perform the method of claim 1.

20. A non-transitory computer readable medium comprising instructions which, when read by one or more processors of a system, cause the system to perform the method of claim 8.

* * * * *